(12) United States Patent
Huang et al.

(10) Patent No.: US 11,296,786 B2
(45) Date of Patent: Apr. 5, 2022

(54) CONSTANT AMPLITUDE CODED DFOS USING OUT-OF-BAND SIGNALING

(71) Applicant: NEC Laboratories America, Inc., Princeton, NJ (US)

(72) Inventors: Yue-Kai Huang, Princeton, NJ (US); Ezra Ip, West Windsor, NJ (US); Fatih Yaman, Princeton, NJ (US)

(73) Assignee: NEC Corporation

( * ) Notice: Subject to any disclaimer, the term of this patent is extended or adjusted under 35 U.S.C. 154(b) by 0 days.

(21) Appl. No.: 17/221,837

(22) Filed: Apr. 4, 2021

(65) Prior Publication Data
US 2021/0314063 A1    Oct. 7, 2021

Related U.S. Application Data

(60) Provisional application No. 63/006,218, filed on Apr. 7, 2020.

(51) Int. Cl.
| | | |
|---|---|---|
| *H04B 10/07* | (2013.01) | |
| *H04B 10/079* | (2013.01) | |
| *H04B 10/294* | (2013.01) | |
| *H04B 10/69* | (2013.01) | |
| *G02B 6/02* | (2006.01) | |
| *G01M 11/00* | (2006.01) | |
| *H04B 10/071* | (2013.01) | |
| *H04J 14/02* | (2006.01) | |

(52) U.S. Cl.
CPC ....... *H04B 10/07957* (2013.01); *G02B 6/022* (2013.01); *H04B 10/294* (2013.01); *H04B 10/6932* (2013.01); *G01M 11/3109* (2013.01); *H04B 10/07* (2013.01); *H04B 10/071* (2013.01); *H04J 14/02* (2013.01)

(58) Field of Classification Search
CPC ............ H04B 10/07957; H04B 10/294; H04B 10/6932; H04B 10/07; H04B 10/071; G02B 6/022; G01M 11/3109; H04J 14/02
USPC ........................................ 398/9–38, 43–103
See application file for complete search history.

(56) References Cited

U.S. PATENT DOCUMENTS

| | | | | |
|---|---|---|---|---|
| 6,122,044 | A * | 9/2000 | Gautheron | G01M 11/3172 356/73.1 |
| 8,606,117 | B1 * | 12/2013 | Turner | G01M 11/3118 398/195 |
| 9,887,770 | B2 * | 2/2018 | Urban | H04B 17/0085 |
| 2003/0231888 | A1 * | 12/2003 | Takashina | H04B 10/079 398/149 |
| 2004/0044489 | A1 * | 3/2004 | Jones | H04L 43/50 702/79 |
| 2005/0025485 | A1 * | 2/2005 | Lee | H04J 14/0298 398/71 |
| 2007/0165680 | A1 * | 7/2007 | Harres | H04L 1/24 370/522 |
| 2008/0131114 | A1 * | 6/2008 | Jang | H04B 10/0771 398/13 |

(Continued)

*Primary Examiner* — Dibson J Sanchez
(74) *Attorney, Agent, or Firm* — Joseph Kolodka

(57) ABSTRACT

Aspects of the present disclosure describe distributed fiber optic sensing (DFOS) systems, methods, and structures that advantageously overcome problems encountered when operating DFOS systems over operational telecommunications facilities namely, cross-phase modulation, and uneven amplitude profiles through the use of a novel constant amplitude coded DFOS employing out-of-band signaling.

1 Claim, 9 Drawing Sheets

(56) References Cited

U.S. PATENT DOCUMENTS

| | | | |
|---|---|---|---|
| 2012/0182023 A1* | 7/2012 | Zhang | H04B 10/071 |
| | | | 324/501 |
| 2013/0251363 A1* | 9/2013 | Joffe | G01M 11/3118 |
| | | | 398/28 |
| 2014/0078506 A1* | 3/2014 | Hu | G01M 11/3127 |
| | | | 356/445 |
| 2016/0112119 A1* | 4/2016 | Vall-Llosera | H04B 10/40 |
| | | | 398/21 |
| 2017/0346550 A1* | 11/2017 | von der Weid | H04B 10/0777 |
| 2017/0353238 A1* | 12/2017 | Huang | H04B 10/071 |
| 2018/0152239 A1* | 5/2018 | Von Der Weid | H04B 10/071 |
| 2020/0136722 A1* | 4/2020 | Urban | H04B 10/071 |

* cited by examiner

CONSTANT AMPLITUDE CODED DFOS USING OUT-OF-BAND SIGNALING

CROSS REFERENCE

This disclosure claims the benefit of U.S. Provisional Patent Application Ser. No. 63/006,218 filed 7 Apr. 2020 the entire contents of which is incorporated by reference as if set forth at length herein.

TECHNICAL FIELD

This disclosure relates generally to distributed fiber optic sensing (DFOS) and telecommunications over a common optical fiber conveying both DFOS signals and telecommunications signals simultaneously.

BACKGROUND

A major impediment to integrating DFOS and telecommunications signals on a common optical fiber is nonlinear cross-talk that occurs between the two types of signals. Given the contemporary interest in such simultaneous operation of DFOS and telecommunications over a common optical fiber, —systems, methods, and structures that permit or otherwise improve such simultaneous operation would be a welcome addition to the art.

SUMMARY

An advance in the art is made according to aspects of the present disclosure directed to distributed fiber optic sensing systems (DFOS), methods, and structures that advantageously overcome problems encountered when operating DFOS systems over operational telecommunications facilities namely, cross-phase modulation, and uneven amplitude profiles.

In sharp contrast to the prior art, systems, methods, and structures according to aspects of the present disclosure employ a novel constant amplitude coded DFOS employing out-of-band signaling.

According to aspects of the present disclosure, with our coded DFOS system, an out-of-band signal is generated and sent along with a coded sequence. The signal generation is synchronized such that the combination of the coded sequence and the out-of-band signal combined together yields a constant amplitude. When interrogating the fiber using the combined signal, the system is surprisingly free of large power fluctuations and therefore minimize cross-phase modulation XPM distortion to neighboring communication channels. Also—by using the constant amplitude generated in our scheme, all parts of the coded sequence receive an equal gain after optical amplification—free of amplifier dynamics. Advantageously, an out-of-band signal can then be removed during signal detection by a receiver either by optical, electrical, or digital filtering techniques—depending on system design.

BRIEF DESCRIPTION OF THE DRAWING

A more complete understanding of the present disclosure may be realized by reference to the accompanying drawing in which:

FIG. 2(A) a typical coded sequence using chirped frequencies for DAS interrogation; and FIG. 2(B) a corresponding autocorrelation function in logarithm scale according to aspects of the present disclosure;

FIG. 2(A) a chirp coded sequence distorted by EDFA gain dynamics; and FIG. 3(B) a corresponding autocorrelation function in logarithm scale according to aspects of the present disclosure;

FIG. 4(A) and FIG. 4(B) are a pair of plots showing constant amplitude interrogation signal using out-of-band single frequency tone: wherein FIG. 4(A) is a temporal waveform; and FIG. 4(B) a frequency spectrum according to aspects of the present disclosure; and FIG. 5(A) and FIG. 5(B) are a pair of plots showing constant amplitude interrogation signal using chirped out-of-band signal: wherein FIG. 5(A) is a temporal waveform; and FIG. 4(B) a frequency spectrum according to aspects of the present disclosure.

DESCRIPTION

Figure 1:
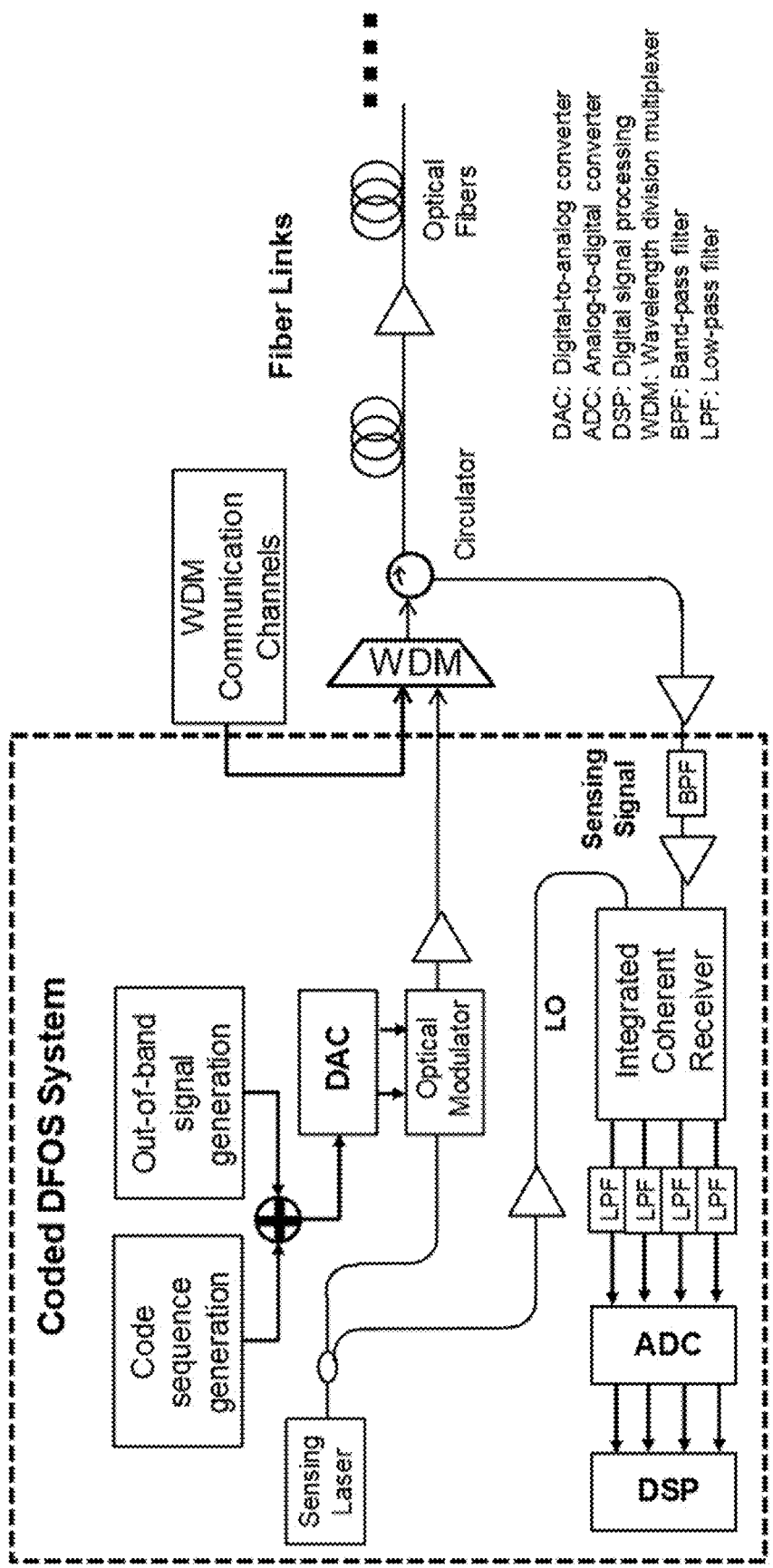
FIG. 1 is a schematic diagram illustrating a coded constant-amplitude DFOS system with out-of-band signal generation according to aspects of the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we begin by noting that distributed fiber optic sensing (DFOS) is an important and widely used technology to detect environmental conditions (such as temperature, vibration, stretch level etc.) anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be a signal of forward direction that uses the speed difference of multiple modes.

Without losing generality, the following description assumes reflected signal though the same approaches can be applied to forwarded signal as well.

As will be appreciated, a contemporary DFOS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as a power level change that indicates—for example—a mechanical vibration.

The reflected signal is converted to electrical domain and processed inside the interrogator. Based on the pulse injection time and the time signal is detected, the interrogator determines at which location along the fiber the signal is coming from, thus able to sense the activity of each location along the fiber.

Those skilled in the art will understand and appreciate that by implementing a signal coding on the interrogation signal enables the sending of more optical power into the fiber which can advantageously improve signal-to-noise ration (SNR) of Rayleigh-scattering based system (e.g. distributed acoustic sensing or DAS) and Brillouin-scattering based system (e.g. Brillouin optical time domain reflectometry or BOTDR).

As currently implemented in contemporary implementations, dedicated fibers are assigned to DFOS systems in fiber-optic cables—physically separated from existing optical communication signals which are conveyed in different fiber(s). However, given the explosively growing bandwidth demands, it is becoming much more difficult to economically operate and maintain optical fibers for DFOS operations only. Consequently, there exists an increasing interest to integrate communications systems and sensing systems on a common fiber.

One of the greatest challenges in integrating sensing and communication signals on the same fiber as noted previously is the nonlinear cross-talk that occurs between the sensing and communications signals. One reason is that the instantaneous operation power of the DFOS signals is much higher as compared to the communications signals (channels), thus degrading communications performance due to fiber nonlinearity. Implementing a signal coding in DFOS allows reduction of the instantaneous operation power in the interrogation signal, however, there still exists a large power fluctuation in the beginning and the falling edges of the code sequence—which in turn leads to cross phase modulation (XPM) distortion on neighboring wavelength division multiplexed (WDM) communication channels.

Yet another difficulty when applying a coding to a DFOS system is the signal amplification. As is known and understood, an erbium-doped fiber amplifier (EDFA) arguably remains the best medium for optical signal amplification and as a result they are widely used in communications fibers. With respect to a possible signal coding noted, as the length of a code sequence increases, however, it approaches the carrier recovery time of the erbium atoms. As a result, an amplified output signal will exhibit an uneven amplitude profile and the code sequence will experience a decreasing gain over the period of the whole sequence. If uncorrected, the uneven amplitude profile will affect the auto-correlation function of the implemented code and cause signal crosstalk between different fiber segments in the DFOS system.

FIG. 1 is a schematic block diagram of a coded constant-amplitude DFOS system with out-of band signal generation according to aspects of the present disclosure. In the depicted block diagram, we illustratively show how out-of-band signal generation will be applied to the DFOS system according to aspects of the present disclosure.

Operationally, we assume that the DFOS system will be Rayleigh-scattering based system (e.g. distributed acoustic sensing or DAS) and Brillouin-scattering based system (e.g. Brillouin optical time domain reflectometry or BOTDR) with a coding implementation. With such coding designs, these systems will be most likely be integrated with fiber communication systems due to their lower power operation and will also be more affected by the optical amplifier response time.

In the arrangement illustratively shown in the block diagram, we assume that the coded interrogation sequence is generated digitally and modulated onto the sensing laser via digital-to-analog-conversion (DAC) and an optical modulator. The modulated interrogation sequence may be amplified to optimal operation power before being directed into the fiber for interrogation.

Advantageously, the DFOS operation may also be integrated together with communication channels via WDM in the same fiber. Inside the sensing fiber, the interrogation sequence and the returned sensing signal may be optically amplified—either via discrete (EDFA/SOA) or distributed (Raman) methods. A returned sensing signal is routed to a coherent receiver after amplification and optical band-pass filtering. The coherent receiver detects the optical fields in both polarizations of the signal, down-converting them to 4 baseband lanes for analog-to-digital conversion (ADC) sampling and digital signal processor (DSP) processing. As those skilled in the art will readily understand and appreciate, the decoding operation is done in the DSP to generate the interrogated Rayleigh or Brillouin response of the fiber, and the changes in the response is then identified and interpreted for sensor readouts.

With continued reference to the figure, since the coded interrogation sequence is generated digitally, the out-of-band signal is also generated digitally, and then combined with the code sequence before waveforms are created by the DAC. When generated together digitally, the out-of-band signal will only be generated outside the time period of the code sequence, so when added together, the combined waveform will have a constant amplitude.

Note that it is also possible to generate the out-of-band signal separately using a different DAC or waveform generator and combine it with a code-sequence. In that illustrative scenario, any separate modules need to be synchronized so that their relative waveform start/end time match such that the combined waveform maintains a constant amplitude.

Advantageously, it is also possible to optically generate the out-of-band signal and combine it with the code sequence in the optical domain.

Note that during the transmission, interrogation, and reception of the DFOS signal, the signal will be amplified by one or multiple optical amplifiers. With extended code length, a signal will experience different gain in the different part of the code sequence due to the optical amplifier carrier recovery response, if the signal is not a constant amplitude across the interrogation frame. According to aspects of the present disclosure—with our innovation—the out-of-band signal combined with the code sequence will keep the overall signal amplitude constant, and therefore stabilize the gain response.

In the case where sensing signals share the same fiber as WDM communication channels, keeping the signals at a constant amplitude will advantageously result in a performance benefit as well. Fiber nonlinearity crosstalk due to XPM, which can be problematic during the rising and falling edges of code sequences, will be minimized according to our inventive techniques. More particularly, the combined sensing signal will remove the amplitude fluctuations exhibited in the original code sequence and therefore mitigate XPM crosstalk.

We note that the out-of-band signal has no actual contribution in the coding/decoding operation of the DFOS system. After reception of the sensing signal, it is removed from the coded signal before decoding by the DSP. The removal can be done by optical, electrical, or digital filters. Since the sensing signal likely exhibits a narrow band, so we assume an optical filter will not be used. As such, in the illustrative block diagram, we assume electrical filtering is used for cost and complexity purposes as lower sampling speed can be adopted for ADC after LPF.

Figure 2A:
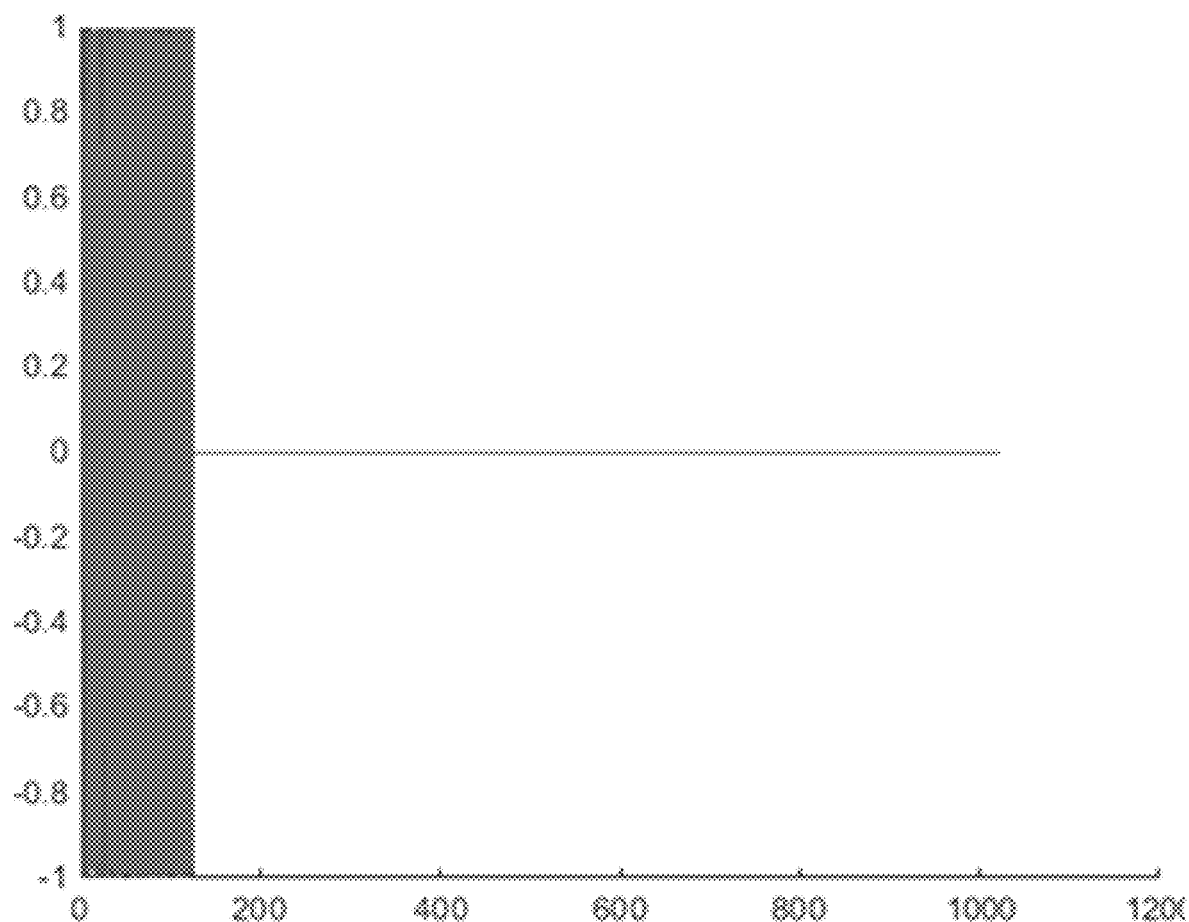
FIG. 2(A) and FIG. 2(B) are a pair of plots showing.

To further describe aspects of our inventive disclosure, we use a coded DAS system which uses chirped code sequence as an example. The real and imaginary waveform of the chirp sequence is shown in FIG. 2(A). The length of the sequence is 127 chip, with any remainder of the interrogation frame filled with zeros.

Figure 2B:
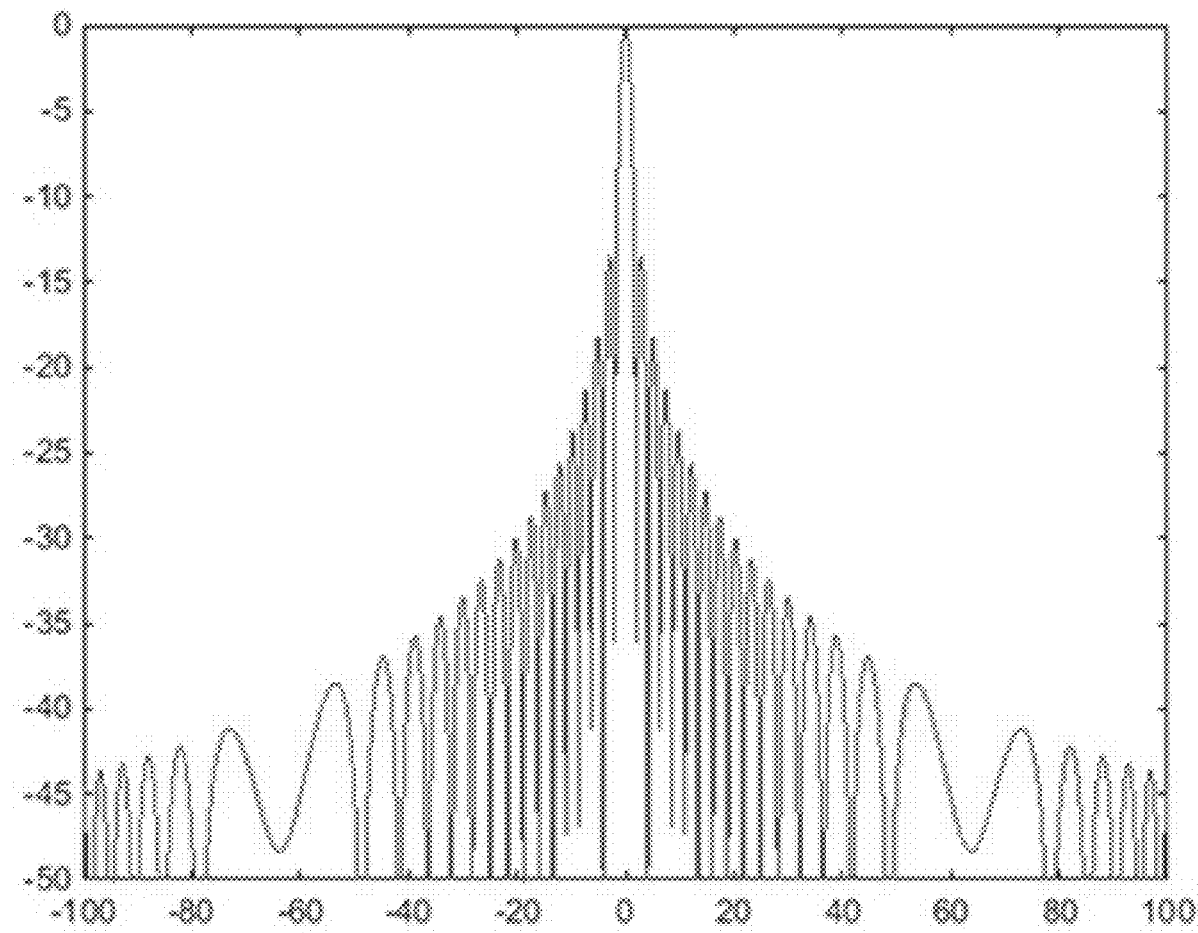
Figure 3A:
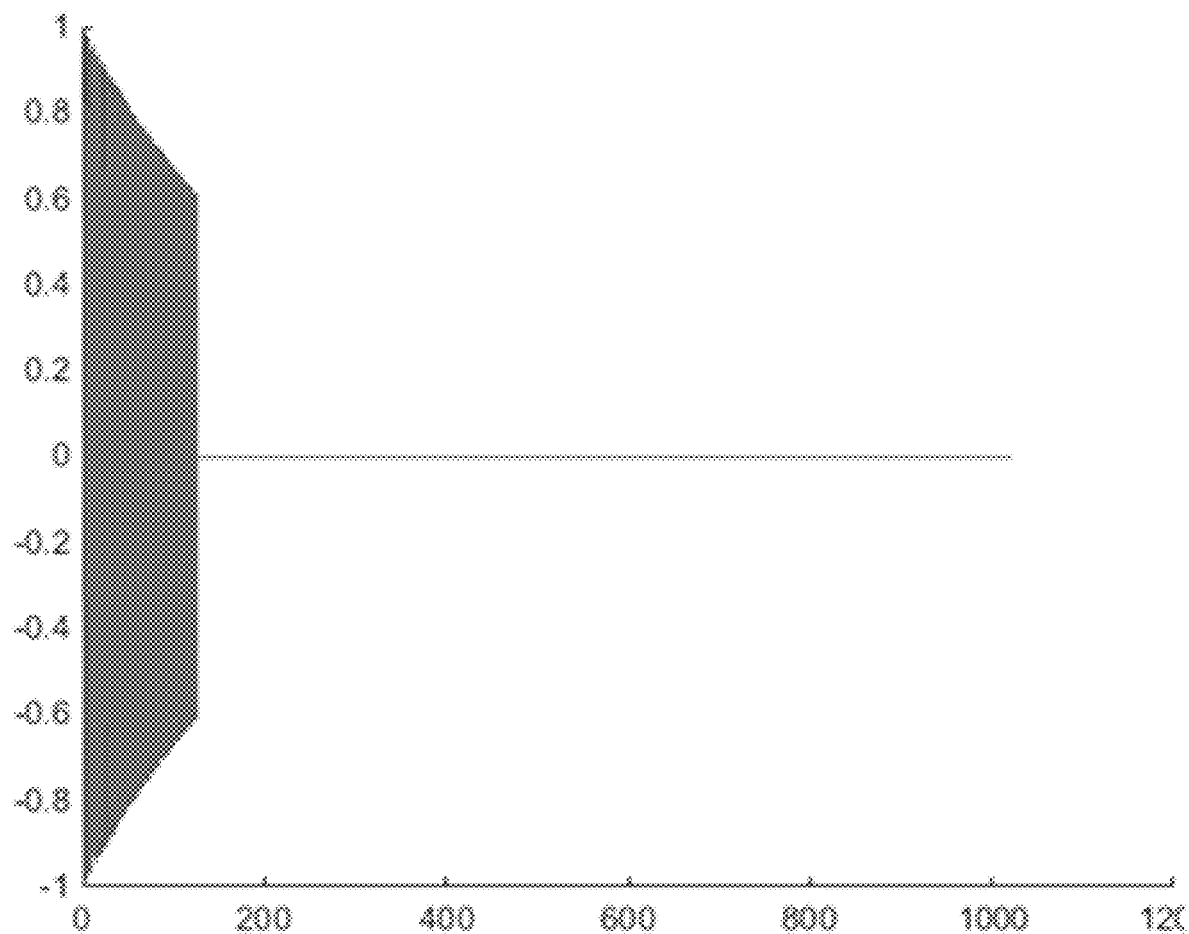
FIG. 3(A) and FIG. 3(B) are a pair of plots showing.
Figure 3B:
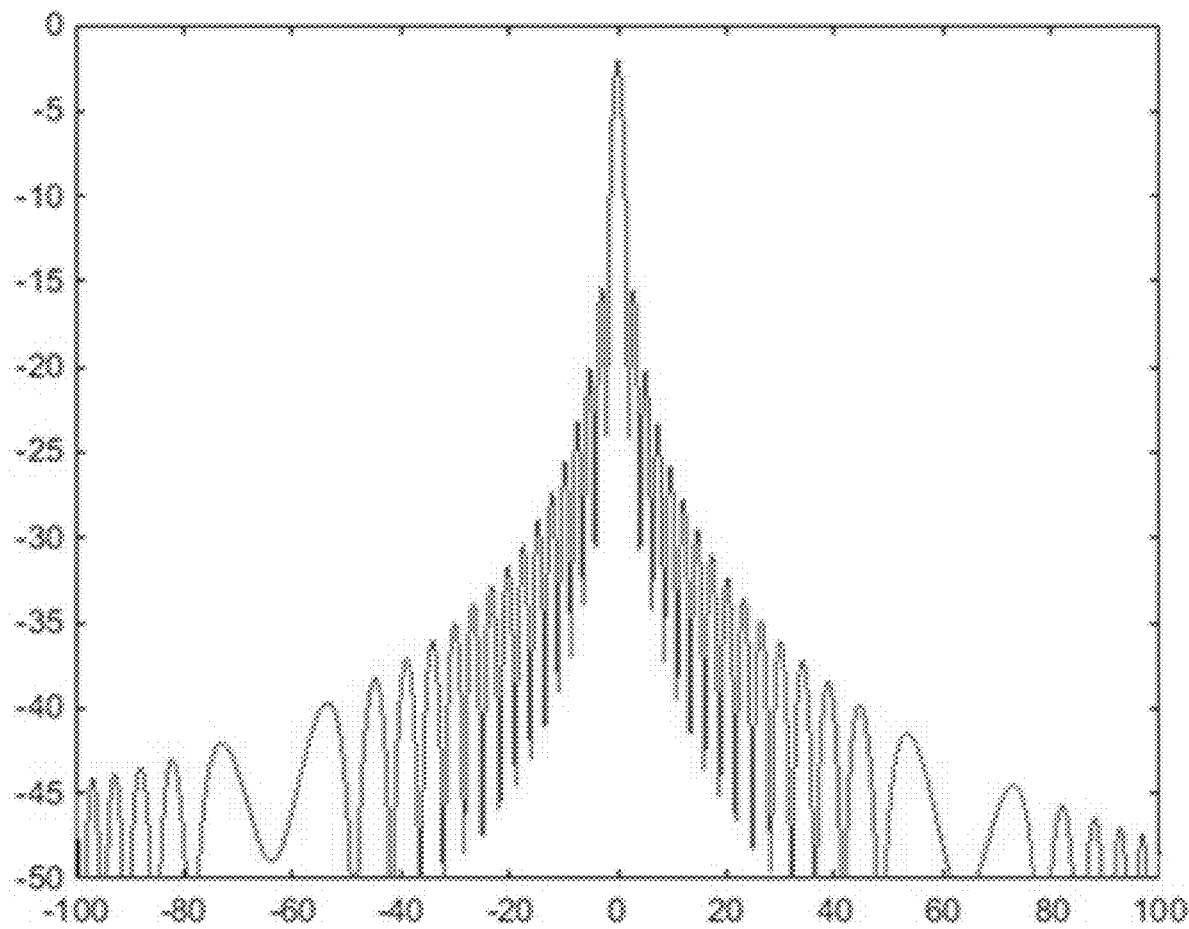

The autocorrelation function of the sequence is shown in FIG. 2(B), with the response falling quickly below −15 dB after the first side lobe. The autocorrelation property of code allows the DAS interrogator to send a long sequence, with more optical power, into the fiber to achieve better SNR, while maintaining the spatial resolution (~2 chip) of distributive sensing after decoding One challenge in using a long sequence for DFOS system is the amplification of the optical interrogation sequence and the returned sensing signal and it. Optical amplifiers such as EDFA and SOA has gain dynamics which correspond to the carrier recovery time, this will create uneven gain response across the code sequence, because the input signal to the amplifier has uneven power distribution in time. This phenomenon is illustrated in FIG. 3(A), as the initial part of the code sequence traverses the EDFA, the carriers start to deplete and the latter part(s) of the sequence receive less and less gain. This gain dynamic will distort the code sequence, and, as a result, the corresponding autocorrelation function, shown in FIG. 3(B), will be impacted. Compared to FIG. 2(B), the ratio of the autocorrelation peak to the side interference has reduced, thus the DAS performance after decoding will suffer as a result. The gain dynamic issue will also affect the DFOS system via optical amplifiers used in the fiber links as well as the receiver amplifiers since the returned sensing signal also exhibit uneven power profile over time.

Yet another problem is when a DFOS system is integrated with existing communication systems/signals in a same/common optical fiber. We note that this problem is not limited to DFOS with coding—in fact by using a coding DFOS system we can reduce the operation signal power which can help with this issue. The main problem is due primarily to a large fiber nonlinearity cross-talk that occurs due to the large power fluctuation(s) of the DFOS interrogation signal(s). The large power fluctuation is clearly observed in our example of chirped code sequence shown in FIG. 2(A), as the rising and falling edges of the sequence has large optical amplitude swings. These instances will create nonlinear cross-talks to neighboring communication channels due to XPM, if the sensing signal is integrated via WDM.

Figure 4A:
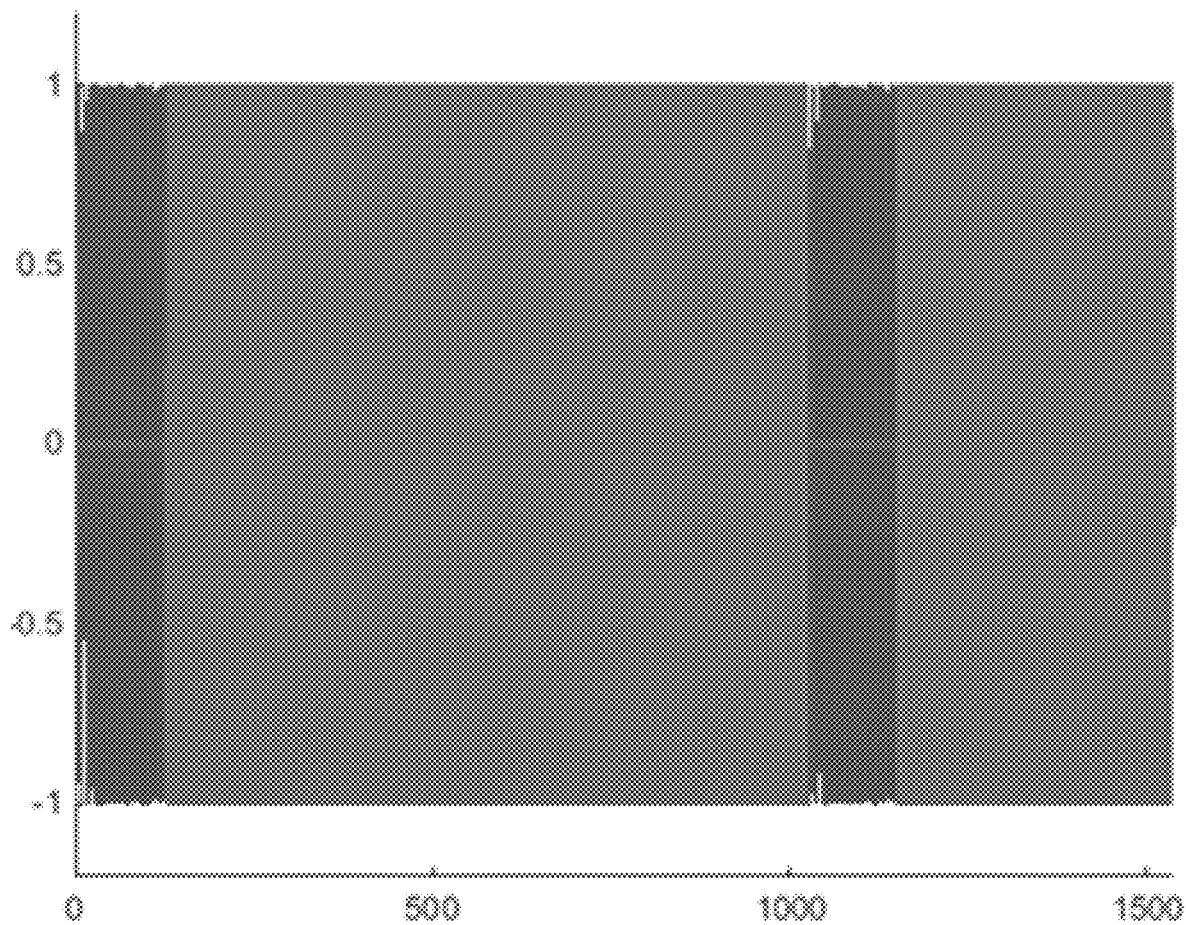
Figure 4B:
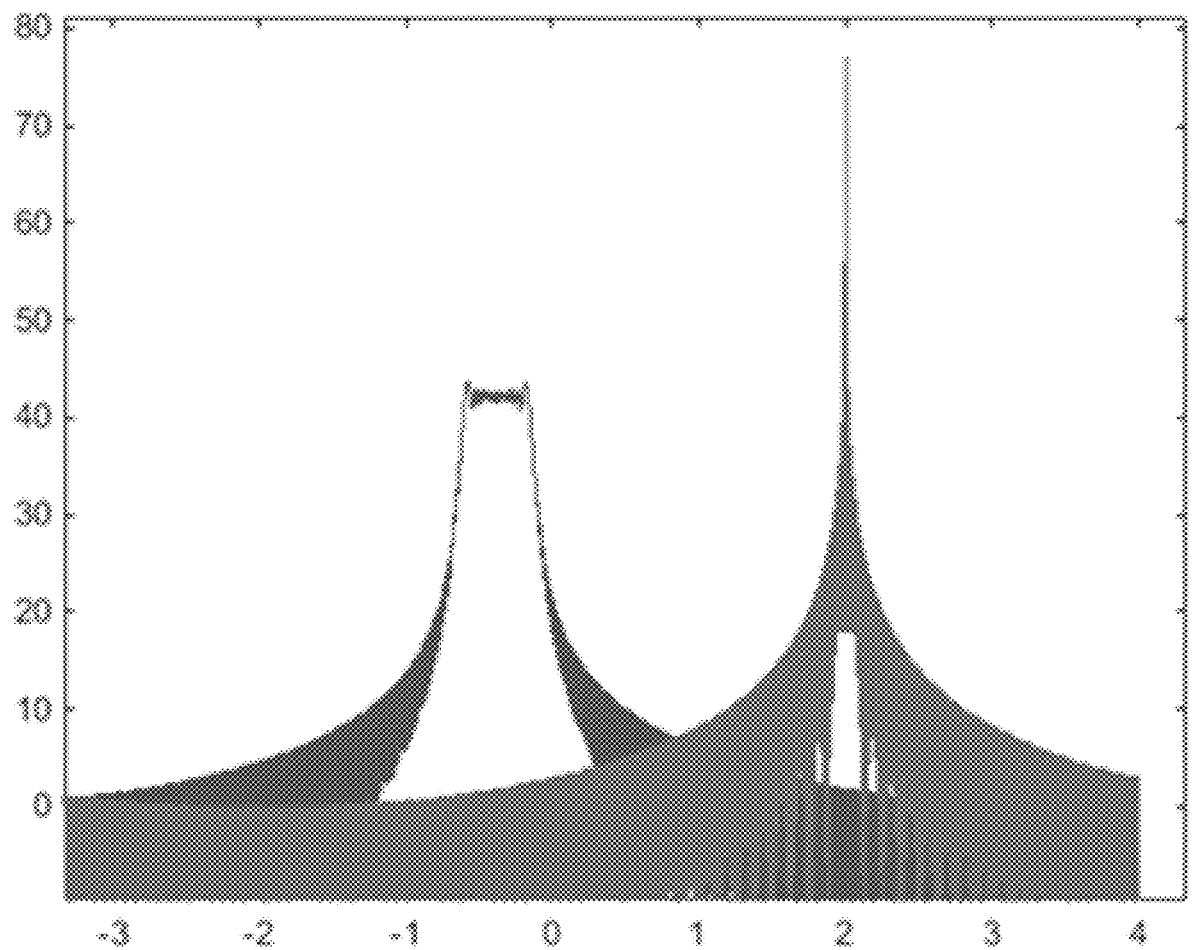

Advantageously, systems, methods, and structures according to our inventive disclosure specifically solve these two main issues by creating an out-of-band signal which is amplified and transmitted together with a main code sequence. One of such example is shown in FIG. 4(A), where a single frequency tone is used as the out-of-band signal. The single frequency waveform is added outside of the time occupied by the code sequence with equal amplitude so that the combined signal will achieve constant amplitude. (Note that only the real part of the signal is shown.) The tone frequency is deliberately selected to be outside of the code sequence operation frequency band, as shown in FIG. 4(B). Therefore, the out-of-band signal can be easily removed by filtering before decoding process at the DFOS receiver DSP.

With the added out-of-band signal, the interrogation signal and the returned sensing signal will have constant amplitude distributed across time. In this case, the optical amplification process reaches an equilibrium in the amplifier dynamics and the gain response distortion is substantially eliminated. Advantageously, the large power fluctuations from the original code sequence are also removed. Therefore, the resulting interrogation signal waveform will have exhibit a much reduced XPM nonlinear crosstalk with neighboring communication channels if they are integrated in the same fiber.

We not note that according to aspects of the present disclosure, there are several ways to create and combine the out-of-band signal. A most convenient way is shown in the example illustrated in FIG. 1, that both the main code sequence and the out-of-band signal is created and combined digitally before waveform generation by DAC. As those skilled in the art will readily appreciate, this reduces the number of hardware components, however the sampling speed and bandwidth of the DAC may need to be higher due to the expanded frequency band generation.

Another way to is to generate the electrical waveforms for the code sequence and out-of-band separately and combine them before optical modulation by electrical power combiners. In this case the out-of-band signal can be generated via an RF frequency source or function generators. This method is more complex as the two signal generators need to be synchronized in time and the signal amplitudes adjusted separately to achieve the constant amplitude in the combined signal.

Yet another way is to combine the code-sequence and out-of-band signal optically after generating the optical signals separately. One such example is that the out-of-band signal can be created via acoustic-optic modulator (AOM) where the intrinsic modulator frequency shift can be used to move the laser frequency out of the band. Like the previous case, the two signal generators need to be synchronized and their amplitude tuned to achieve constant amplitude.

For decoding operation in the DFOS, the out-of-band signal needs to be removed from the returned sensing signal. This can be done simply by filtering in optical, electrical, and digital domain. A cost-effective way is electrical low-pass filtering, as shown in FIG. 1 before the ADC. Compared to implementing digital filtering for the added out-of-band signal, it allows the use of lower sampling rate/bandwidth for the ADC, as well as reduce DSP resources required for filtering processes. Optical filters, having wide bandwidths, are likely not suitable for this process, however if the out-of-band signal is located far away from the main code sequence (>10 GHz), then such method can likely be used.

Figure 5A:
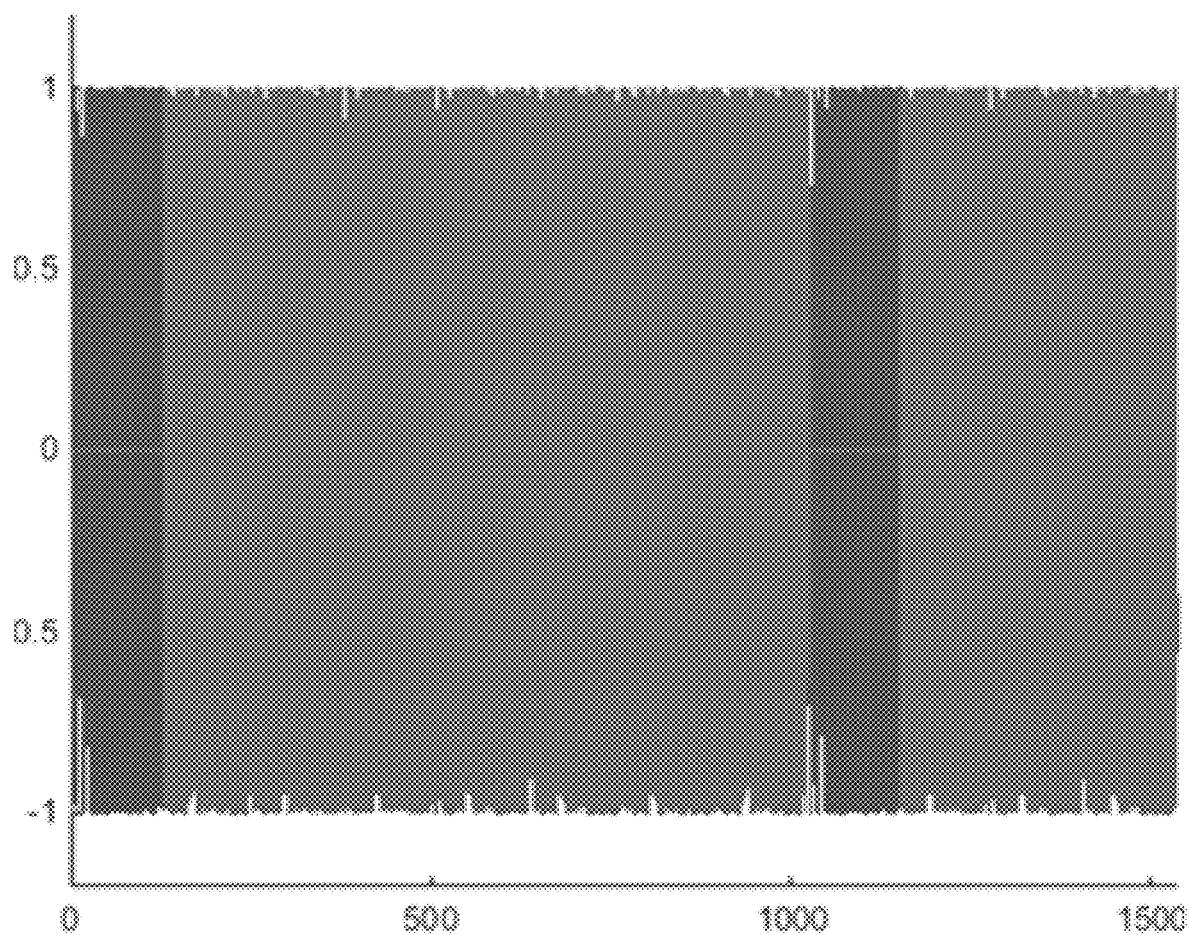
Figure 5B:
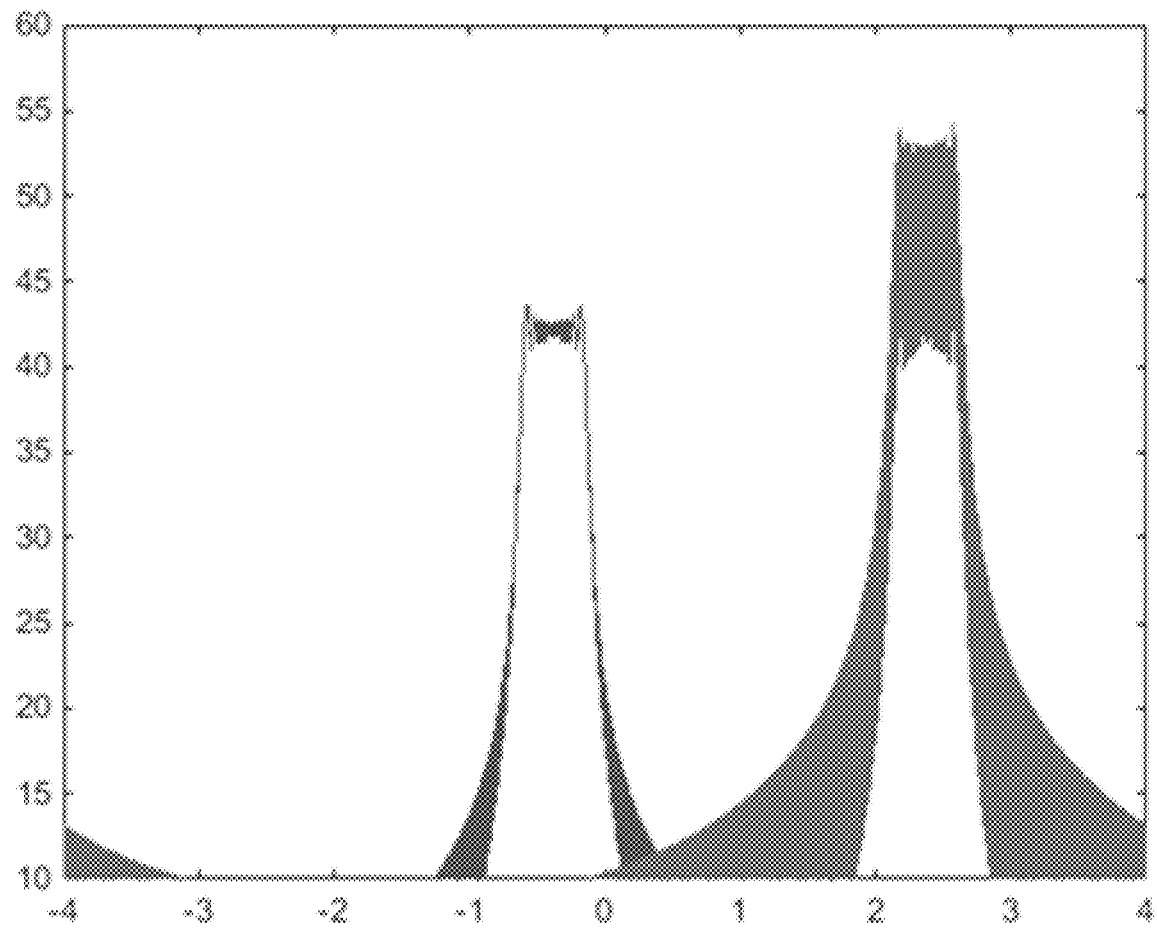

One should note that systems, methods, and structures according to aspects of the present disclosure do not specifically limit the out-of-band signal waveform to a single frequency tone. In FIG. 5(A), we illustrate an example of using chirped waveform as the out-of-band signal. The out-of-band waveform is a frequency shifted version of the original code sequence. The out-of-band waveform is repeated multiple times outside of the time occupied by the code sequence. As the original chirped sequence and the frequency shifted version both have constant amplitudes, the combined signal will achieve constant amplitude as well. (Note that only the real part of the signal is shown.) The frequency-shifted out-of-band chirped signal is separated from the original code sequence, shown in FIG. 5(B). Othere of out-of-band waveforms which exhibit constant amplitude property are M-ary phase-shift-keying (mPSK) signals, which can also be adopted as out-of-band signal for coded DFOS system At this point, while we have presented this disclosure using some specific examples, those skilled in the art will recognize that our teachings are not so limited. Accordingly, this disclosure should only be limited by the scope of the claims attached hereto.

The invention claimed is:

1. A coded distributed fiber optic sensing (DFOS) system comprising:
   a length of optical fiber cable;
   a DFOS interrogator system in optical communication with the length of optical fiber cable;
   an intelligent analyzer configured to analyze DFOS sensing data received by the DFOS interrogator system;
   the distributed fiber optic sensing (DFOS) system CHARACTERIZED BY a code sequence generator that generates a coded interrogation sequence; and
   an out of band signal generator that generates an out-of-band signal (OOS), said OOS being combined with the coded interrogation sequence prior to introduction into the optical fiber cable;
   wherein the OOS is not used by the DFOS system as part of any DFOS sensing data analysis,
   the OOS is filtered out of any DFOS sensing data prior to its analysis,
   the OOS is synchronized with the coded interrogation sequence such that the combination of the two signals is a signal exhibiting a constant amplitude waveform,
   the combined signals are output to the optical fiber cable and using the constant amplitude waveform of the signal an equalized gain for the coded interrogation sequence is produced,
   the DFOS system is integrated in that the optical fiber cable simultaneously conveys non-sensory telecommunications optical signals,
   DFOS interrogation signals and the non-sensory telecommunications optical signals are wavelength-division-multiplexed into the optical fiber cable, and
   the constant amplitude waveform of the DFOS interrogation signals improves any nonlinear cross-talk characteristics with the non-sensory telecommunications optical signals due to reduced cross-phase modulation—as compared with an operation using interrogation signals that did not exhibit the constant amplitude waveform.

* * * * *